United States Patent
Axelowitz et al.

(10) Patent No.: US 11,188,141 B2
(45) Date of Patent: Nov. 30, 2021

(54) VOLTAGE REGION SENSING FOR MAXIMUM SYSTEM POWER

(71) Applicant: Apple Inc., Cupertino, CA (US)

(72) Inventors: Corey N. Axelowitz, San Francisco, CA (US); William R. Allan, II, Boulder Creek, CA (US); Eric C. Gaertner, San Jose, CA (US); Ian P. Shaeffer, Los Gatos, CA (US); Ronald P. Songco, Sunnyvale, CA (US); John T. Orchard, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 199 days.

(21) Appl. No.: 16/127,530

(22) Filed: Sep. 11, 2018

(65) Prior Publication Data

US 2019/0346911 A1    Nov. 14, 2019

Related U.S. Application Data

(60) Provisional application No. 62/670,625, filed on May 11, 2018.

(51) Int. Cl.
*G06F 1/3296* (2019.01)
*G06F 1/3237* (2019.01)
*H02M 7/06* (2006.01)

(52) U.S. Cl.
CPC .......... *G06F 1/3296* (2013.01); *G06F 1/3237* (2013.01); *H02M 7/06* (2013.01)

(58) Field of Classification Search
CPC ....................................................... G06F 1/32
See application file for complete search history.

(56) References Cited

U.S. PATENT DOCUMENTS 8,069,356 B2   11/2011 Rathi
8,248,140 B2   8/2012 Kamatani
(Continued)

FOREIGN PATENT DOCUMENTS

GB    2430316 A  *  3/2007  .......... H01M 10/488

OTHER PUBLICATIONS

"Automatic Detection of USB Port vs Wall Adapter Power," Product Information Datasheet, Skyworks Solutions, Inc., Mar. 19, 2013, 5 pages.
(Continued)

*Primary Examiner* — Kim Huynh
*Assistant Examiner* — Eric Chang
(74) *Attorney, Agent, or Firm* — Kilpatrick Townsend & Stockton, LLP

(57) ABSTRACT

Circuits, methods, and apparatus that may determine one or more characteristics relating to a mains power supply received by a computer system, and may then determine a maximum amount of power that may be drawn by the computer system given the determined characteristics. An example may provide a computer system having a power supply circuit that may include a detection circuit to receive a mains power supply and to detect a characteristic of the mains power supply. In response to the detected characteristic, the detection circuit may provide an output to a circuit in the computer system that sets a limit on a current that may be drawn by the circuit. In this example, the characteristic may be an RMS value of the mains power supply waveform, a location of where the mains power supply is being received, a quality of the mains power supply, or other characteristic.

22 Claims, 9 Drawing Sheets

(56) References Cited

U.S. PATENT DOCUMENTS

| | | | |
|---|---|---|---|
| 2003/0210271 A1* | 11/2003 | King | G09G 5/363 |
| | | | 715/771 |
| 2004/0088388 A1* | 5/2004 | Satoh | H04L 12/18 |
| | | | 709/220 |
| 2009/0179626 A1* | 7/2009 | Smith | H02M 5/293 |
| | | | 323/299 |
| 2017/0353121 A1* | 12/2017 | Liu | H02M 1/42 |

OTHER PUBLICATIONS

Ku, Andrew, "Universal Laptop Power Adapters for the Air, Road, and Wall," [online]. Tom's Hardware Product Reviews, Sep. 2, 2011. Retrieved from the Internet. <URL: http://www.tomshardware.co.uk/laptop-universal-power-adapter,review-32266-4.html>, 6 pages.

Fisher, Tim, "What is a Power Supply Voltage Switch?" [online]. Lifewire, Oct. 19, 2016. Retrieved from the Internet. <URL: https://www.lifewire.com/power-supply-voltage-switch-2625973>, 2 pages.

Deaton, Jamie Page, "How Auto-detecting Power Converters Work," [online]. Howstuffworks.com, Feb. 23, 2009. Retrieved from the Internet. <URL: https://electronics.howstuffworks.com/gadgets/travel/auto-detecting-power-converters.htm>, 5 pages.

Foval Power Step Down 220V to 110V Voltage Converter with 4-Port USB International Travel Adapter for UK European Etc (Use for US appliances Overseas). Product Datasheet [online]. Amazon.com, Dec. 12, 2017, [retrieved on Sep. 12, 2018]. Retrieved from the Internet. <URL: https://www.amazon.com/Voltage-Converter-4-Port-International-Adapter/dp/B073J9QWKY>, 12 pages.

* cited by examiner

VOLTAGE REGION SENSING FOR MAXIMUM SYSTEM POWER

CROSS-REFERENCES TO RELATED APPLICATIONS

This application is a nonprovisional of U.S. provisional patent application number 62/670,625, filed May 11, 2018, which are incorporated by reference.

BACKGROUND

High-performance computer systems may consume substantial amounts of power during computationally intensive periods. Delivering more power in these situations may decrease processing time and increase efficiency. For maximum performance during these periods, it may be desirable to allow the computer systems to draw the maximum of amount of power that may be safely delivered. Thus, what is needed are circuits, methods, and apparatus that may determine a maximum amount of power that may be safely drawn by a computer system.

SUMMARY

Accordingly, embodiments of the present invention may provide circuits, methods, and apparatus that may determine one or more characteristics relating to a mains power supply received by a computer system, and then may determine a maximum power or current that may be safely drawn by the computer system given the determined characteristics. These embodiments of the present invention may then limit the power or current drawn by the computer system such that the maximum power or current is not exceeded.

An illustrative embodiment of the present invention may provide a computer system having a power supply circuit. The power supply circuit may include a zone detection circuit to receive a mains power supply and to detect a characteristic of the mains power supply. In response to the detected characteristic, the zone detection circuit may determine a maximum power or current that may be safely drawn by the computer system. The zone detection circuit may then provide one or more outputs to circuits or components in the computer system, where the outputs prevent the maximum power or current from being exceeded.

Different countries and regions may have regulations or building codes that specify an amount of power or current that may be drawn from a mains power supply. A building code may specify that an outlet in a particular setting, for example a residence or a business, must be able to safely provide a specific amount of power or current. The amount of power or current that a residential outlet must provide is usually lower than what is specified for other types of outlets in a particular country or region. To ensure proper operation throughout the particular country or region, these and other embodiments of the present invention may be designed to operate according to code when receiving a mains power supply from a residential outlet. Accordingly, these and other embodiments of the present invention may determine one or more characteristics of a mains power supply, where the one or more characteristics are indicative of, or a proxy for, the identity of the country or region where the mains power supply is being provided. In these and other embodiments of the present invention, the identity of the actual country or region where the mains power supply is being provided may be determined.

In these and other embodiments of the present invention, a characteristic may be the amplitude of the mains power supply voltage. Specifically, embodiments of the present invention may determine an amplitude of the voltage waveform of the mains power supply, for example the root mean square (RMS) value of the mains power supply waveform. The mains power supply may be received by an RMS measurement circuit that may determine the RMS value of the mains power supply voltage.

This RMS value may be determined in various ways. For example, the RMS value may be determined by measuring a peak voltage of the mains power supply, then multiplying the measured peak voltage by the reciprocal of the square root of two (which is approximately 0.7071.) In these and other embodiments of the present invention, the RMS value may be determined by measuring a peak-to-peak voltage of the mains power supply, then multiplying the measured peak-to-peak voltage by the reciprocal of two times the square root of two (which is approximately 0.3536.) In these and other embodiments of the present invention, the RMS value may be determined by rectifying the mains power supply, measuring an average value of the rectified mains power supply, then multiplying the measured average by pi divided by the product of two times the square root of two (which is approximately 1.11.) In these and other embodiments of the present invention, one or more of these different techniques may be employed.

In these and other embodiments of the present invention, a characteristic may be the geographic location of the mains power supply, or more accurately, the geographic location of the computer system receiving the mains power supply. Specifically, embodiments of the present invention may incorporate a global-positioning system (GPS) that may be used to determine the country or region in which the mains power supply is being provided. For example, a computer system may receive a mains power supply and may power a GPS using that power supply. The GPS may then determine the geographic location where the mains power supply is being provided, or where the computer system receiving the mains power supply is located. In these and other embodiments of the present invention, the geographic location, or the actual identity of the country or region, where the mains power supply is being provided may be determined by asking a user or by retrieving geographic location information from a second device, such as a smartphone or other portable computing device. In these and other embodiments of the present invention, other methods, such as using local cellular service, Wi-Fi mapping, or broadcast signals, may be used in determining the geographic location. In these and other embodiments of the present invention, one or more of these and other techniques may be combined or used as verification of each other. For example, an RMS measurement may be used as a primary indicator, while a GPS measurement, an indication from a second device, local cellular service, Wi-Fi mapping, or broadcast signals may be used as confirmation. In the event that different sources provide different results, the computer system may be limited to drawing the lowest power or current level of the power or current levels indicated by the results, though the computer system may instead be limited to a lowest power or current level.

After the RMS value, geographic location, or other characteristic of the mains power supply has been found, a maximum amount of power or current that may be drawn from the mains power supply may be determined. In these and other embodiments of the present invention the maximum amount of power or current that may be drawn from the mains power supply may be determined by a zone detection circuit with various levels of specificity. For example, a country or region may have a relatively low value for the power or current that may be drawn from a mains power supply. Accordingly, an embodiment of the present invention may determine whether the mains power supply is being provided in that country or region. If it is, then the maximum power or current draw may be set to the limits provided by that country or region. If the mains power supply is provided in another country or region, a higher value may be used as a limit for the maximum power or current draw.

In another example, a country or region may have a relatively low value for the power or current that may be drawn from a mains power supply, another may have an intermediate value, while another may have a relatively high value. Accordingly, an embodiment of the present invention may determine whether the mains power supply is being provided in a country or region having the lower value, the intermediate value, or the higher value. If it is in a country or region having the lower value, then the maximum power or current draw may be set to a lower limit, if it is in a country or region having the intermediate value, the maximum power or current draw may be set to an intermediate limit, while if it is in a country or region having a higher value, the maximum power or current draw may be set to a higher limit. In another example, a high value of a maximum power or current draw may be permitted in countries having a mains power supply in the 220 volt range, while a lower value of power or current may be permitted in a country having a mains power supply in the 110 volt range. These and other embodiments of the present invention may determine a maximum power or current draw with an even greater specificity.

In these and other embodiments of the present the actual region or country might not be determined, rather a characteristic may provide a proxy or an indication of the region or country. For example, when the characteristic is an RMS value, the zone detection circuit may determine whether the RMS value is above or below a certain level, or whether the RMS value is within one of a number of ranges. Based on the result, a maximum power or current draw may be determined. When the characteristic is geographic location, the zone detection circuit may include look-up tables to receive a geographic location and provide a maximum power or current that may be drawn. In these and other embodiments of the present invention, the zone detection circuit may access information stored externally, for example over the internet.

In these and other embodiments of the present invention, when the location of a mains power supply is uncertain, the computer system may default to drawing the lowest, or a lower, power or current level. In these and other embodiments of the present invention, when an RMS value of the mains supply is uncertain, the computer system may default to drawing the lowest, or a lower, power or current level. These and other embodiments of the present invention may include a quality measurement circuit to measure the quality of a received mains power supply. For example, the consistency of an RMS measurement over several samples may be determined. Also, the consistency among results where different types of RMS measurements are made may be determined. If the presence of amplitude or phase noise or power supply variation results in inconsistent measurements of an RMS voltage, the computer system may default to drawing the lowest, or a lower, power or current level.

When a mains power supply is used to power a computer system, current may flow through power conduits, an outlet or socket, a power cord into the computer system, and wired connections in the computer system. Each of the elements of this path may have a resistance. The current flowing through these resistances and into the computer system may create voltage drops. These voltage drops may reduce an amplitude of the received mains power supply voltage, making RMS measurements inaccurate. Also, changes in the current may cause noise on the received mains power supply voltage, thereby reducing the apparent quality of the mains power supply. Accordingly, embodiments of the present invention may provide an auxiliary power supply. This auxiliary power supply may provide power to an RMS measurement circuit, a zone detection circuit, and a quality measurement circuit, if present. Power for a central processing unit (CPU), graphics processing units (GPUs), and other circuits or components of the computer system may be withheld until the maximum power or current that may be drawn is determined. Once a power profile including the maximum power or current has been generated, a main power supply may be activated and power may be delivered to other circuits and components in the computer system. Measuring an RMS value of the mains power supply voltage when the computer system is at least partially unpowered may reduce these ground drops and may improve the RMS measurements.

In these and other embodiments of the present invention, an RMS value or geographic location of the mains power supply may be determined at various times. For example, RMS measurements may be made on power-up, or when various reset events occur. Geographic locations may be determined on power up, or when various reset events occur. In these and other embodiments of the present invention, RMS measurements may be performed in real-time, or on a near real-time basis, while the maximum power or current draw may be updated continuously, or on an occasional or regular basis. In these and other embodiments of the present invention, RMS and quality measurements may be performed in real-time, or in a near real-time basis, while the maximum power or current draw may be updated continuously or on an occasional or regular basis.

Once the maximum power or current draw is determined, the power or current draw of the computer system may be limited in various ways such that the maximum power or current draw is not exceeded. For example, a regulated power supply voltage provided to one or more circuits and components in the computer system may be varied to adjust the computer system power or current draw. In these and other embodiments of the present invention, a frequency of a clock signal provided to one or more circuits may be varied to adjust the power or current draw. In these and other embodiments of the present invention, one or more outputs may be provided to one or more circuits and components in the computer system. For example, power sink limits (P-limits), may be provided to one or more circuits and components in the computer system. These outputs or P-limits may set a P-state of the one or more circuits and components. These P-limits may adjust power supply voltages and clock frequencies provided to one or more circuits or components. These P-limits may also cause the insertion of wait or interrupt states that may be used to adjust the power or current draw of one or more circuits or components. In these and other embodiments of the present invention, one or more circuits or components may be fully or partially disabled in order to ensure that the maximum power or current draw is not exceeded. For example, they may be disabled using P-limits, by setting a state of one or more enable signals, by disconnecting or reducing one or more power supply voltages, by disabling one or more clock signals, by varying one or more of these or other signals or voltages provided to the one or more components, or by using other techniques. The disabled circuits or components may be non-critical or redundant circuits or components. The circuits and components may include one or more central processing units, graphics processing units, or other circuits or components.

These and other embodiments of the present invention may provide power supply circuitry and apparatus that may be located in various types of devices, such as desktop computing devices, computing systems, servers, modular computing devices, all-in-one computers, and other devices.

Various embodiments of the present invention may incorporate one or more of these and the other features described herein. A better understanding of the nature and advantages of the present invention may be gained by reference to the following detailed description and the accompanying drawings.

DESCRIPTION OF EXEMPLARY EMBODIMENTS

Computer systems may receive power from a mains power supply through a wall outlet or other power connection. The performance of these computer systems may be improved by operating components in the computer system at a higher clock rate, higher supply voltage, or by varying other parameters. This may increase an amount of power or current drawn from the mains power supply. Accordingly, it may be desirable to for a computer system to draw as much power or current from a mains power supply as may be safely delivered.

The amount of power or current that may be safely delivered may be determined from one or more characteristics of the mains power supply. Accordingly, embodiments of the present invention may provide circuits, methods, and apparatus that may determine one or more characteristics of a mains power supply provided to a computer system. From these one or more characteristics, a maximum amount of power or current that may be safely drawn may be determined. These embodiments may then limit an amount of power or current drawn by the computer system such that this maximum is not exceeded.

Different countries and regions may have regulations or building codes that specify the amount of power or current that may be drawn from the mains power supply. A building code may specify that an outlet in a particular setting, for example a residence or a business, must be able to safely provide a specific amount of power or current. The amount of power or current that a residential outlet must provide is usually lower that what is specified for other types of outlets in a particular country or region. To ensure proper operation throughout the particular country or region, these and other embodiments of the present invention may be designed to operate properly when receiving a mains power supply from a residential outlet. The mains power supplies may include circuit-breakers, fuses, or other protective devices or circuits that may trip or shut power off to ensure that the amount of power or current specified by the building code is not exceeded. Accordingly, these and other embodiments of the present invention may determine a characteristic of the mains power supply, where the characteristic is indicative of, or a proxy for, the identity of the country or region where the mains power supply is being provided to the computer system (though the actual identity may be used in these and other embodiments of the present invention.) Once this characteristic is known, power or current drawn by the computer system may be limited to an appropriate maximum value such that a circuit breaker or other protective component is not tripped. An example is shown in the following figure.

Figure 1:
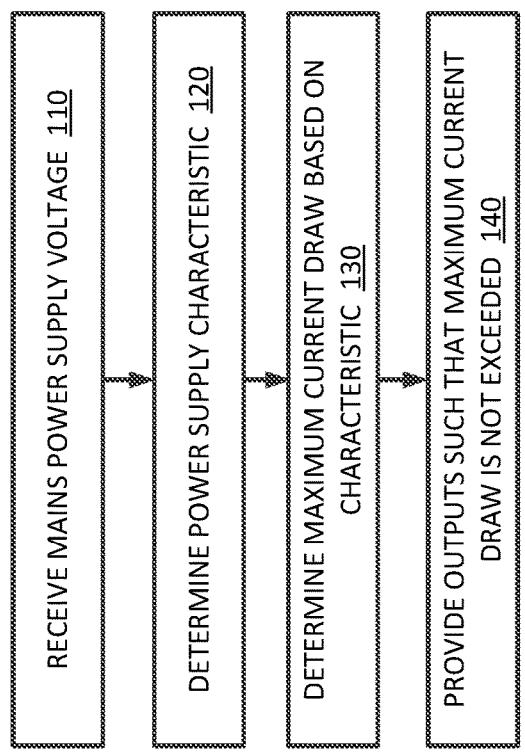
FIG. 1 is a flowchart illustrating the operation of a power supply circuit according to an embodiment of the present invention.

FIG. 1 is a flowchart illustrating the operation of a power supply circuit according to an embodiment of the present invention. This figure, as with the other included figures, is shown for illustrative purposes and does not limit either the possible embodiments of the present invention or the claims.

A mains power supply voltage may be received from a mains power supply in act 110. The mains power supply voltage may be received from a wall outlet, such as a residential outlet, or other power connection. The mains power supply voltage may be received by a power supply circuit or other type of circuit, which may be located in a computer system or other electronic device. In act 120, a characteristic of the mains power supply may be determined, where the characteristic is a proxy for the identity of the country or region where the mains power supply is being provided (or where the power supply circuit is located, though these may typically be the same.) This determination may be made, or received by, circuitry in or associated with the power supply circuit. This power supply region may be a geographical, political, or other type of region, country, or territory. In act 130, a maximum power or current that may be drawn from the mains power supply may be determined based on the determined characteristic. In act 140, output signals, such as power supply limits, clock signals, or other output signals may be provided to one or more circuits or components in the computer system. These outputs may be based on the maximum current draw and may control or adjust the power or current drawn by the computer system such that the maximum is not exceeded. These one or more circuits or components may include central processing units, graphics processing units, and other circuits or components.

Figure 2:
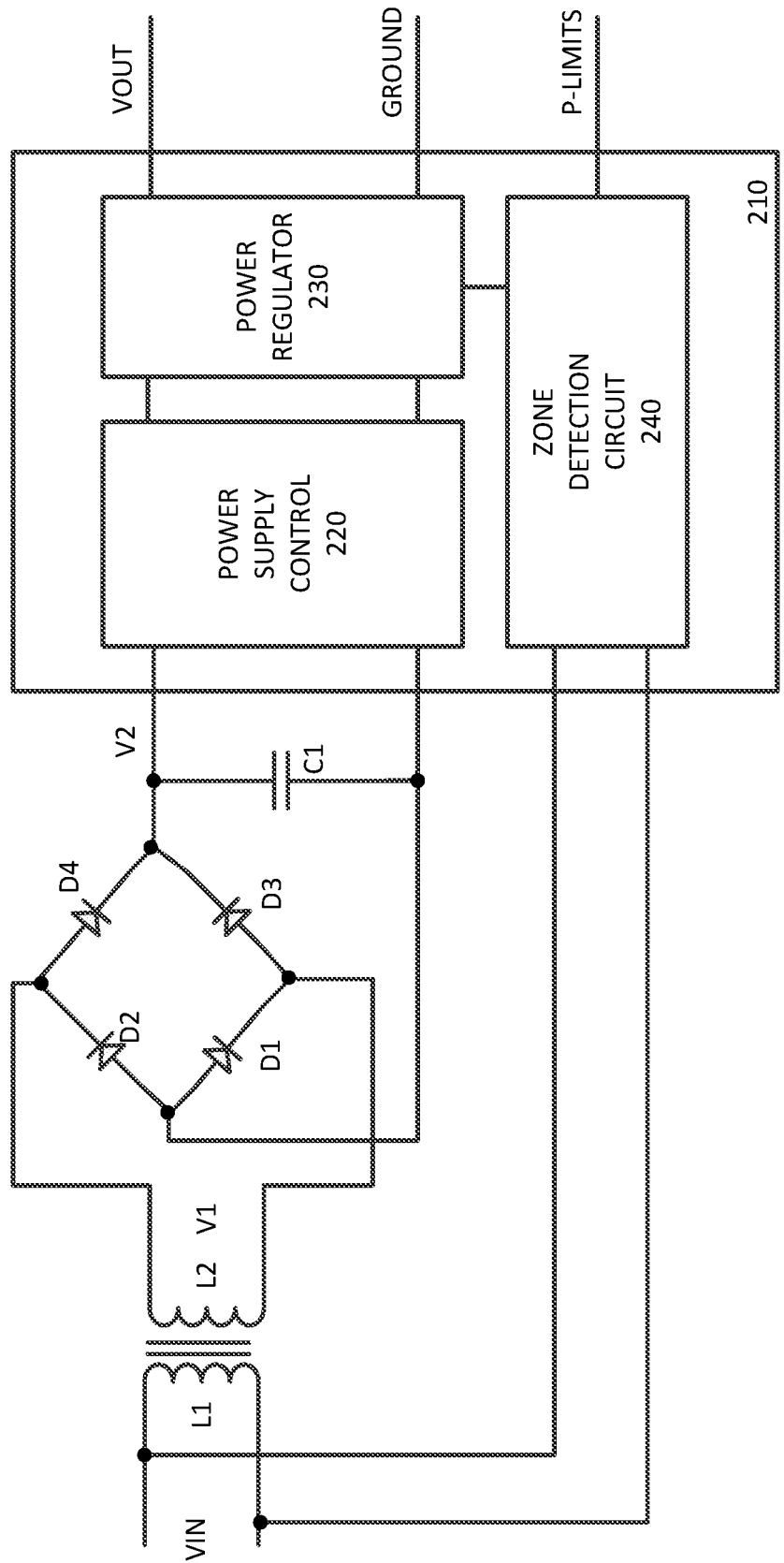
FIG. 2 is a simplified block diagram of power supply circuitry according to an embodiment of the present invention.

FIG. 2 is a simplified block diagram of power supply circuitry according to an embodiment of the present invention. In this example, power may be received from a mains power supply via a wall outlet, such as a residential outlet, or other connection at input VIN. The voltage VIN may be inductively coupled by transformer inductors L1 and L2 and provided to a diode bridge that includes diodes D1-D4. The diode bridge D1-D4 may rectify the received power supply signal. The rectified voltage may be filtered by a capacitor or filter network, shown here as C1, resulting in a DC voltage V2. The voltage V2 may be received by power supply control 220 in power supply circuit 210. Power supply control 220 may control power regulator 230, which may provide an output voltage to other circuits or components (shown in FIG. 9) in a computer system or other electronic device housing power supply circuit 210.

Figure 9:
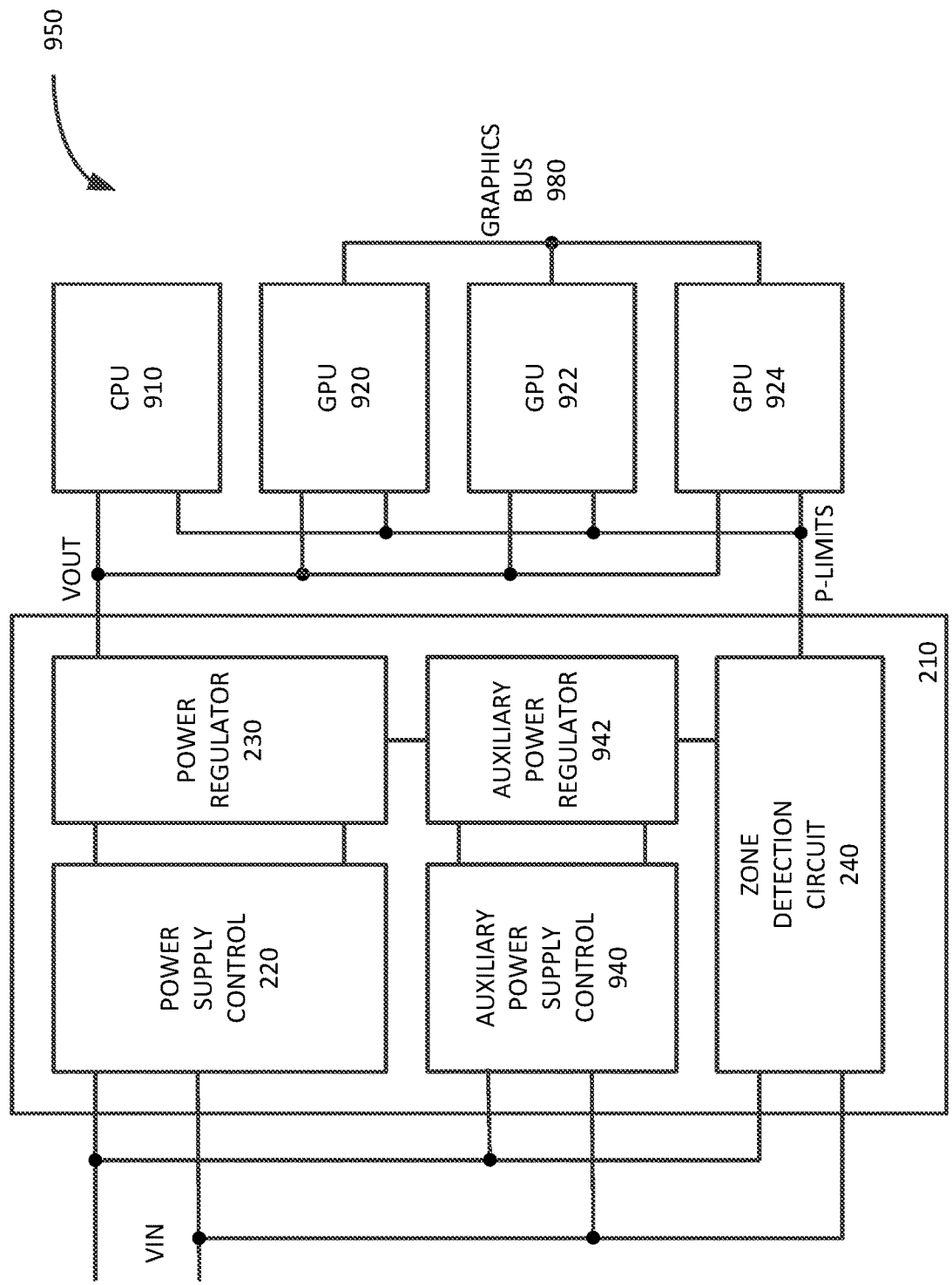
FIG. 9 is a block diagram of computer system according to an embodiment of the present invention.

The mains power supply voltage VIN may be received by zone detection circuit 240 in power supply circuit 210. Zone detection circuit 240 may determine one or more characteristics of the mains power supply VIN, and from that determination may provide one or more outputs, such as power sink limits or P-limits, to other circuits or components in the computer system. These P-limits or other outputs may adjust or control the power or current drawn by the circuits or components such that a maximum power or current is not exceeded. The circuits and components may include one or more central processing units, graphics processing units, or other circuits or components (as shown in FIG. 9.) In these and other embodiments of the present invention, zone detection circuit 240 may receive the voltage V1 on the secondary side of the transformer L1-L2, it may receive V2, or it may receive a different voltage.

In these and other embodiments of the present invention, power supply control 220, power regulator 230, zone detection circuit 240, and the other circuits described here or shown in power supply circuit 210 may be implemented using analog components, analog circuits, digital or logic circuits, software, firmware, or a combination thereof. For example, zone detection circuit 240 may be implemented using a combination of analog and digital circuitry. RMS measurement circuit 410 (shown below in FIG. 4), GPS 610 (shown in below FIG. 6), and quality measurement circuit 810 (shown in below FIG. 8), and other circuits in these and other embodiments of the present invention, may be implemented using analog components, analog circuits, digital or logic circuits, software, firmware, or a combination thereof.

In these and other embodiments of the present invention, a specific determination of a particular country or region might not be necessary. Instead, one or more other characteristics may be used as a proxy for the identity of the country or region where the mains power supply is provided in determining a maximum amount of power or current that may be safely drawn. For example, different countries and regions may provide mains power supplies having various voltages and current levels. Accordingly, in these and other embodiments of the present invention, the characteristic that may be used as a proxy may be an amplitude, root mean square (RMS) value, or other value of a parameter of the voltage waveform of the mains power supply. An example is shown in the following figures.

Figure 3:
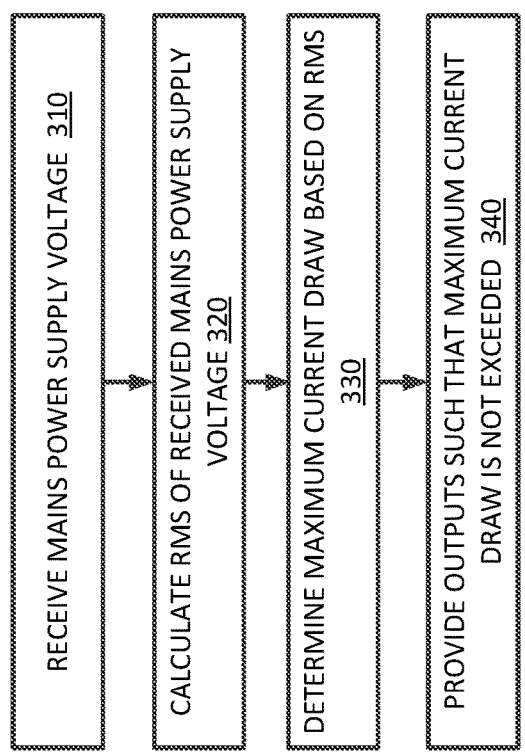
FIG. 3 is a flowchart illustrating the operation of another power supply circuit according to an embodiment of the present invention.

FIG. 3 is a flowchart illustrating the operation of a power supply circuit according to an embodiment of the present invention. A mains power supply voltage may be received from a mains power supply in act 310. This mains power supply may be received using a wall outlet, such as a residential outlet, or other appropriate connection. This mains power supply may be received by a power supply circuit or other circuit, which may be located in a computer system or other electronic device. An RMS value of the received mains power supply voltage may be determined in act 320. In these and other embodiments of the present invention, this value may be determined in various ways.

In act 330, once the RMS value of the mains power supply voltage waveform has been determined, a maximum power or current that may be drawn from the mains power supply may be determined. The maximum power or current may be determined by, or received by, zone detection circuitry in or associated with the power supply circuit or computer system. For example, depending on circuit implementation the zone detection circuitry may determine whether the RMS value is above or below a specific level, or whether the RMS value is within one of a number of ranges. Depending on the result, a maximum power or current that may be drawn by the computer system or other electronic device may be determined. In act 340, output signals, such as power supply limits, clock signals, or other output signals may be provided to one or more circuits and components in the computer system. These outputs may control or adjust the power or current drawn by the computer system such that the maximum power or current is not exceeded. These one or more circuits and components may include central processing units, graphics processing units, and other circuits.

Figure 4:
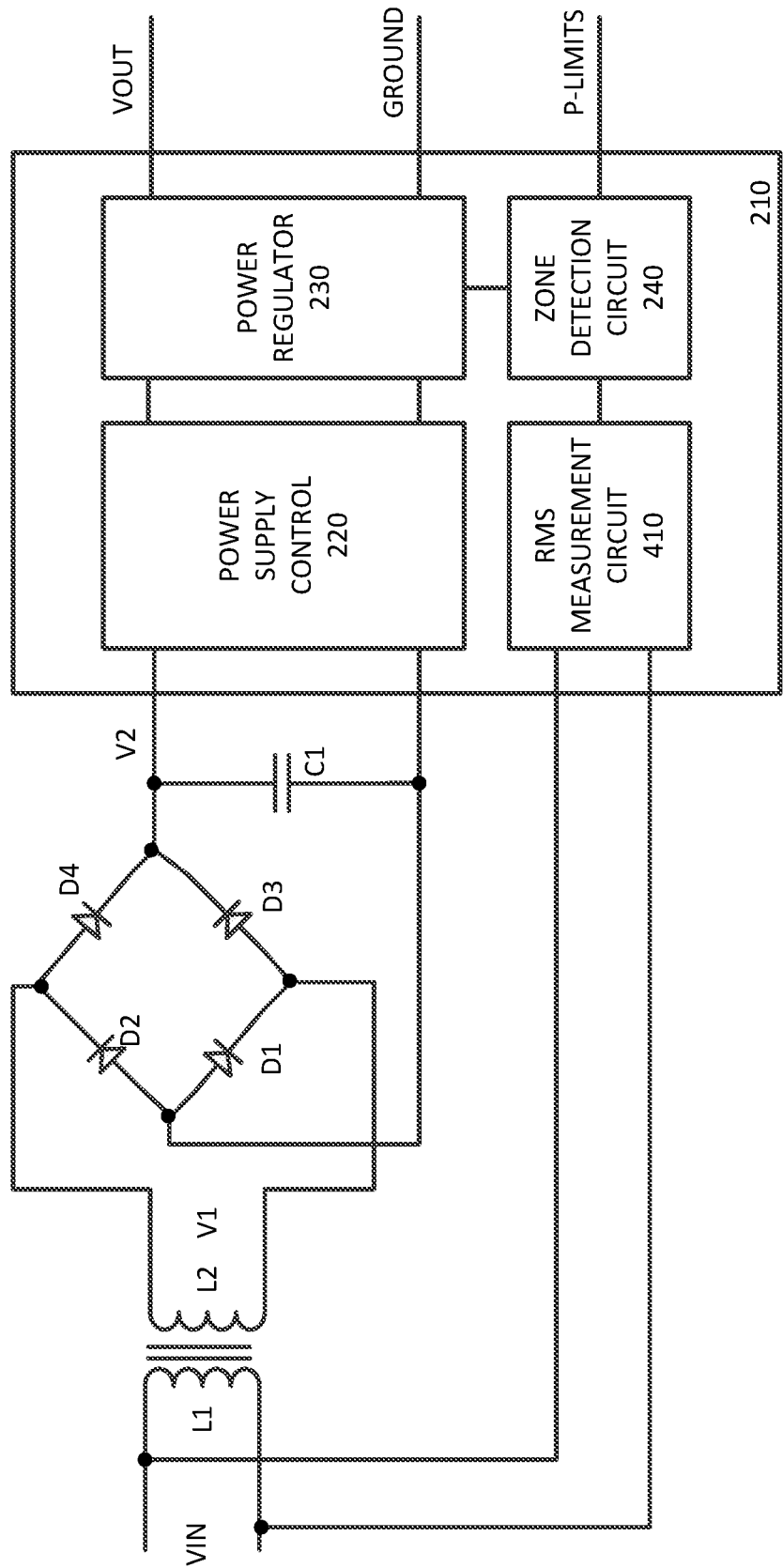
FIG. 4 is a simplified block diagram of power supply circuitry according to an embodiment of the present invention.

FIG. 4 is a simplified block diagram of power supply circuitry according to an embodiment of the present invention. In this example, power may be received from a mains power supply via a wall outlet, such as a residential outlet, or other connection at VIN. This voltage may be inductively coupled by transformer inductors L1 and L2 and provided to a diode bridge that includes diodes D1-D4. The diode bridge D1-D4 may rectify the received power supply signal. The rectified voltage may be filtered by a capacitor or filter network, represented here by C1, resulting in the DC voltage V2. The voltage V2 may be received by power supply control 220 in power supply circuit 210. Power supply control 220 may control power regulator 230, which may provide an output voltage to other circuits (shown in FIG. 9) in a computer system or other electronic device housing power supply circuit 210.

The mains power supply VIN may also be received by RMS measurement circuit 410 in power supply circuit 210. In these and other embodiments of the present invention, RMS measurement circuit 410 may receive the voltage V1 on the secondary side of the transformer L1-L2, it may receive V2, or it may receive another appropriate voltage. RMS measurement circuit 410 may determine RMS value of the mains power supply voltage waveform VIN. For example, the RMS value may be determined by measuring a peak voltage of the mains power supply, then multiplying the measured peak voltage by the reciprocal of the square root of two (which is approximately 0.7071.) In these and other embodiments of the present invention, the RMS value may be determined by measuring a peak-to-peak voltage of the mains power supply, then multiplying the measured peak-to-peak voltage by the reciprocal of two times the square root of two (which is approximately 0.3536.) In these and other embodiments of the present invention, the RMS value may be determined by rectifying the mains power supply, measuring an average of the rectified mains power supply, then multiplying the measured average by pi divided by the product of two times the square root of two (which is approximately 1.11.) In these and other embodiments of the present invention, one or more of these different techniques may be employed.

Once the RMS value for the voltage waveform VIN has been measured, a maximum power or current that may be drawn from the mains power supply may be determined. In this example, zone detection circuit 240 may receive the RMS measurement from RMS measurement circuit 410. Zone detection circuit 240 may then determine whether the RMS value is above or below a specific level, or whether the RMS value is within one of a number of ranges. Depending on the result, a maximum power or current that may be drawn by the computer system or other electronic device may be determined.

In these and other embodiments of the present invention the maximum amount of power or current that may be drawn from a mains power supply may be determined with various levels of specificity. For example, a country or region may have a relatively low value for the power or current that may be drawn from a mains power supply. Accordingly, an embodiment of the present invention may determine whether the mains power supply is being provided in that country or region. If it is, then the maximum power or current draw may be set to the limits provided by that country or region. If the mains power supply is provided in another country or region, a higher value may be used as a limit for the maximum power or current draw.

For example, Japan presently uses a mains power supply having a line voltage of 101 volts with a 106 volt maximum, the maximum power draw is 1200 watts, and the maximum current draw is 10 amps. The United States presently uses a mains power supply having a line voltage of 120 volts with a 108 volt minimum, the maximum power draw is 1440 watts, and the maximum current draw is 12 amps. Accordingly, embodiments of the present invention may measure an RMS value of a mains power supply to determine if the 1200 watt or 1440 watt limit should be used. Specifically, RMS measurement circuit 410 may measure the RMS value of the mains power supply. Since the maximum line voltage in Japan is 106 and the minimum line voltage in the United States is 108, zone detection circuit 240 may determine whether the RMS value is above or below 107 volts. If the RMS value is below 107 volts, zone detection circuit 240 may provide P-limits that set a maximum power draw for the computer system at 1200 watts. If the RMS value is above 107 volts, zone detection circuit 240 may provide P-limits that set a maximum power draw for the computer system at 1440 watts. To be able to separate mains power supplies at 106 and 108 volts, RMS measurement circuit 410 may have an accuracy of 0.5 volts.

In another example, a country or region may have a relatively low value for the power that may be drawn from a mains power supply, another may have an intermediate value, while another may have a relatively high value. Accordingly, an embodiment of the present invention may determine whether the mains power supply is being provided in a country or region having the lower value, the intermediate value, or the higher value. If it is in a country or region having the lower value, then the maximum power or current draw may be set to a lower limit, if it is in a country or region having the intermediate value, the maximum power or current draw may be set to an intermediate limit, while if it is in a country or region having a higher value, the maximum power or current draw may be set to a higher limit.

For example, in these and other embodiments of the present invention, zone detection circuit 240 may determine whether the RMS value measured by RMS measurement circuit 410 is in one of three ranges. These ranges may be from 90 to 107.5 volts, from 107.5 volts to 180 volts, or from 180 to 240 volts, though these values may vary in these and other embodiments of the present invention. Examples of countries in these ranges may be Japan, the United States, and Great Britain, respectively. Determination that the RMS value received from RMS measurement circuit 410 is in one of these ranges may cause zone detection circuit 240 to limit the maximum power draw of a computer system to 1000 watts, 1200 watts, and 1440 watts respectively. These and other embodiments of the present invention may provide zone detection circuits 240 that determine a maximum power or current draw with even more specificity.

In these and other embodiments of the present invention, a high level of a maximum power or current draw may be permitted in countries or regions having a mains power supply in the 220 volt range, while a lower level of power may be permitted in a country or region having a mains power supply in the 110 volt range. These and other embodiments of the present invention may provide zone detection circuits 240 that determine a maximum power or current draw with even more specificity.

In these and other embodiments of the present invention, once the maximum power or current draw has been determined, the power or current draw of the computer system may be limited in various ways such that the maximum power or current draw is not exceeded. For example, a voltage provided to one or more circuits and components in the computer system may be varied to adjust the computer system power or current draw. In these and other embodiments of the present invention, a frequency of a clock signal provided to one or more circuits may be varied to adjust the power or current draw. In these and other embodiments of the present invention, one or more outputs may be provided to one or more circuits and components in the computer system. In the above example, P-limits may be provided to one or more circuits and components in the computer system, where the P-limits may set a P-state of the one or more circuits and components in the computer system. These P-limits may adjust power supply voltages and clock frequencies provided to one or more circuits or components. These P-limits may also cause the insertion of wait or interrupt states that may be used to adjust the power draw of one or more circuits or components. In these and other embodiments of the present invention, one or more circuits or components may be fully or partially disabled in order to ensure that the maximum power or current draw is not exceeded. For example, they may be disabled using P-limits, by setting a state of one or more enable signals, by disconnecting or reducing one or more power supply voltages, by disabling one or more clock signals, by varying one or more of these or other signals or voltages provided to the one or more components, or by using other techniques. The disabled circuits or components may be non-critical or redundant circuits or components. The circuits and components may include one or more central processing units, graphics processing units, or other circuits or components. An example of such a computer system is shown in FIG. 9.

In these and other embodiments of the present invention, instead of inferring a voltage region from a proxy, such as an RMS value, a geographic location where the mains power supply is being provided may be determined. In these and other embodiments of the present invention, a determination of the geographic location of the computer system may be more practical. An example is shown in the following figure.

Figure 5:
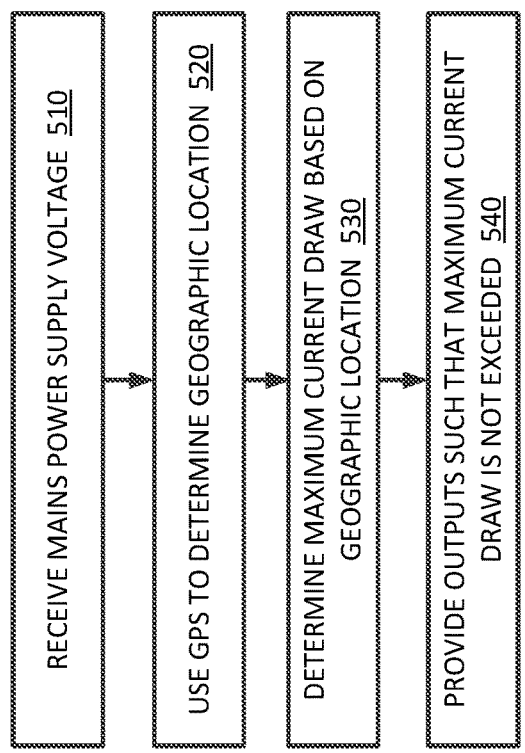
FIG. 5 is a flowchart illustrating the operation of another power supply circuit according to an embodiment of the present invention.

FIG. 5 is a flowchart illustrating the operation of a power supply circuit according to an embodiment of the present invention. In act 510, a mains power supply voltage may be received. This mains power supply may be received from a wall outlet, such as a residential outlet, or other appropriate connection. This mains power supply may be received by a power supply circuit or other circuit, which may be in a computer system or other type of electronic device. In act 520, a GPS circuit may be powered by the received mains power supply, or other power supply, and may be used to determine a geographic location of the computer system.

Based on the geographic location, a maximum power or current that may be drawn may be determined in act 530. Again, this geographic location may be in a geographical or political country, region, or territory, where regulations, building codes, or other limits may specify a maximum amount of power or current that may be drawn from the local mains power supply. These regulations, building codes, or other limits may be used in determining the maximum power or current may be drawn. In act 540, output signals, such as power supply limits, clock signals, or other output signals may be provided to one or more circuits or components in the computer system. These outputs may control or adjust power or current drawn by the circuits and components such that the maximum power or current is not exceeded. These one or more circuits may include central processing units, graphics processing units, and other circuits or components.

Figure 6:
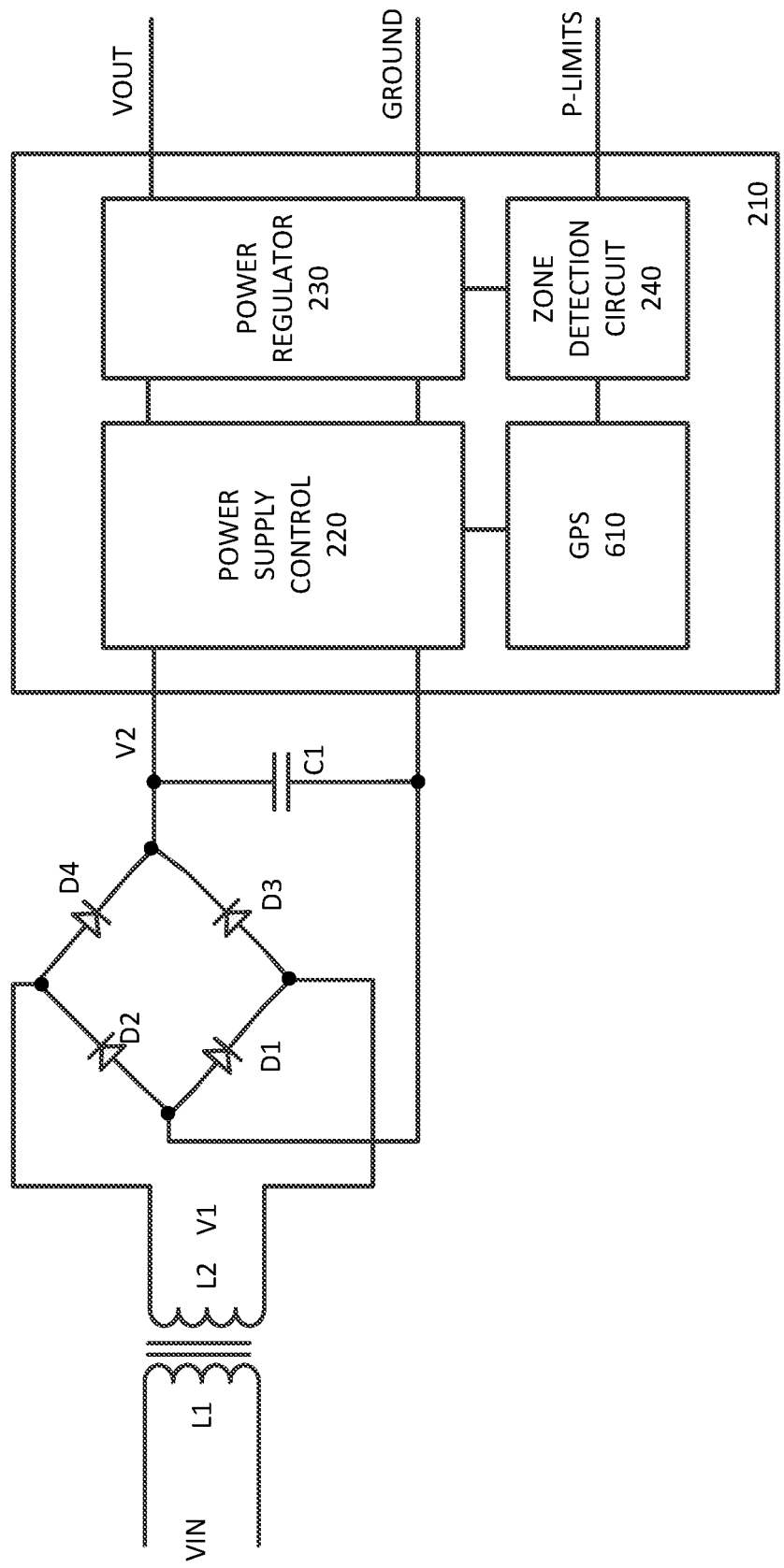
FIG. 6 is a simplified block diagram of power supply circuitry according to an embodiment of the present invention.

FIG. 6 is a simplified block diagram of power supply circuitry according to an embodiment of the present invention. In this example, power may be received from a mains power supply via a wall outlet, such as a residential outlet, or other connection at VIN. This voltage may be inductively coupled though a transformer including inductors L1 and L2 and provided to a diode bridge that includes diodes D1-D4. The diode bridge D1-D4 may rectify the received mains power supply signal. The rectified voltage may be filtered by a capacitor or filter network, represented here by C1, resulting in the DC voltage V2. The voltage V2 may be received by power supply control 220 in power supply circuit 210. Power supply control 220 may control power regulator 230, which may provide an output voltage VOUT to other circuits or components (shown in FIG. 9) in a computer system or other electronic device housing this power supply circuit.

GPS 610 in or associated with power supply circuit 210 may be powered by this or another output voltage. GPS 610 may determine the geographic location of the computer system or other electronic device housing power supply circuit 210. Based on the geographic location, zone detection circuit 240 may provide one or more outputs, such as P-limits to other circuits in the computer system. In these and other embodiments of the present invention, zone detection circuit 240 may include look-up tables to receive a geographic location and provide a maximum power or current that may be drawn. In these and other embodiments of the present invention, zone detection circuit 240 may access information stored externally, for example over the internet. This external information may be used with, or instead of, information stored locally in look-up tables. Zone detection circuit 240 may provide one or more outputs, such as P-limits, to other circuits or components in the computer system. These P-limits or other outputs may adjust or control the power or current drawn by the circuits or components such that a maximum power or current is not exceeded. The circuits and components may include one or more central processing units, graphics processing units, or other circuits or components (as shown in FIG. 9.)

In these and other embodiments of the present invention, the geographic location, or the actual identity of the country or region, where the mains power supply is being provided or may be determined by asking a user or by retrieving location information from a second device, such as a smartphone or other portable computing device. In these and other embodiments of the present invention, other methods, such as using local cellular service, Wi-Fi mapping, or broadcast signals may be used in determining a location where the mains power supply is being provided. In these and other embodiments of the present invention, one or more of these and other techniques may be combined or used as verification of each other. For example, an RMS value for a mains power supply voltage waveform may be used as a primary indicator, while a GPS measurement, an indication from a second device, local cellular service, Wi-Fi mapping, or broadcast signals may be used as confirmation. In the event that different sources provide different results, the computer system or other electronic device may draw the lowest power or current level of those indicated by the results, or the computer system may default to a lowest power or current level.

In these and other embodiments of the present invention, other considerations may be taken into account in determining a maximum amount of power or current that may be drawn from a mains power supply. For example, in these and other embodiments of the present invention, when the location of a mains power supply is uncertain (for example due to inconsistent RMS or GPS readings), the computer system may default to drawing the lowest, or a lower, power or current level. In these and other embodiments of the present invention, when an RMS value of the mains supply is uncertain, the computer system may default to drawing the lowest, or a lower, power or current level. These and other embodiments of the present invention may include a circuit to determine the quality of a received mains power supply. For example, a consistency of RMS measurements may be determined. Also, where different methods are used to calculate RMS, the consistency between these methods may be determined. If the presence of noise or power supply variation results in inconsistent measurements of an RMS voltage, the computer system may default to drawing the lowest, or a lower, power or current level. An example is shown in the following figures.

Figure 7:
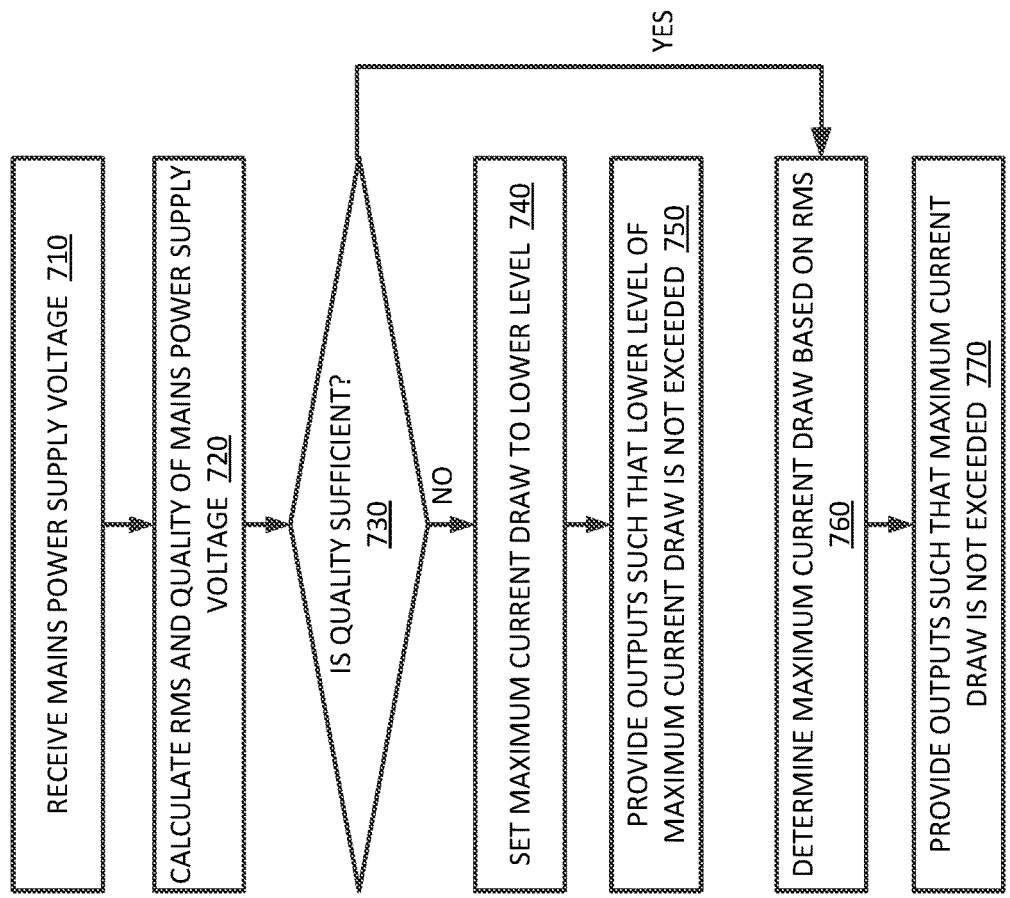
FIG. 7 is a flowchart illustrating the operation of another power supply circuit according to an embodiment of the present invention.

FIG. 7 is a flowchart illustrating the operation of a power supply circuit according to an embodiment of the present invention. In act 710, a mains power supply voltage may be received. This mains power supply may be received from a wall outlet, such as a residential outlet, or other appropriate connection. This mains power supply may be received by a power supply circuit or other circuit, which may be located in a computer system or other electronic device. In act 720, an RMS value and quality of the mains power supply voltage may be determined. In act 730, it may be determined whether the quality of the mains power supply is sufficient. For example, the mains power supply may have excessive amplitude or phase noise, inconsistencies in amplitude, or other characteristics that may indicate it has a poor quality. If the quality of the mains power supply is poor, the permissible maximum power or current draw may be set to a lower value in act 740. In act 750, outputs, such as P-limits, may be provided to circuits or components in the computer system or other electronic device based on this reduced current draw.

If the quality or the mains power supply is sufficient in act 730, a current draw based on the RMS value may be determined in act 760. In act 770, outputs, such as P-limits, may be provided to circuits or components in the computer system based on the RMS value, where the P-limits control or adjust power or current drawn by the circuits or components to ensure that the maximum power or current is not exceeded.

Figure 8:
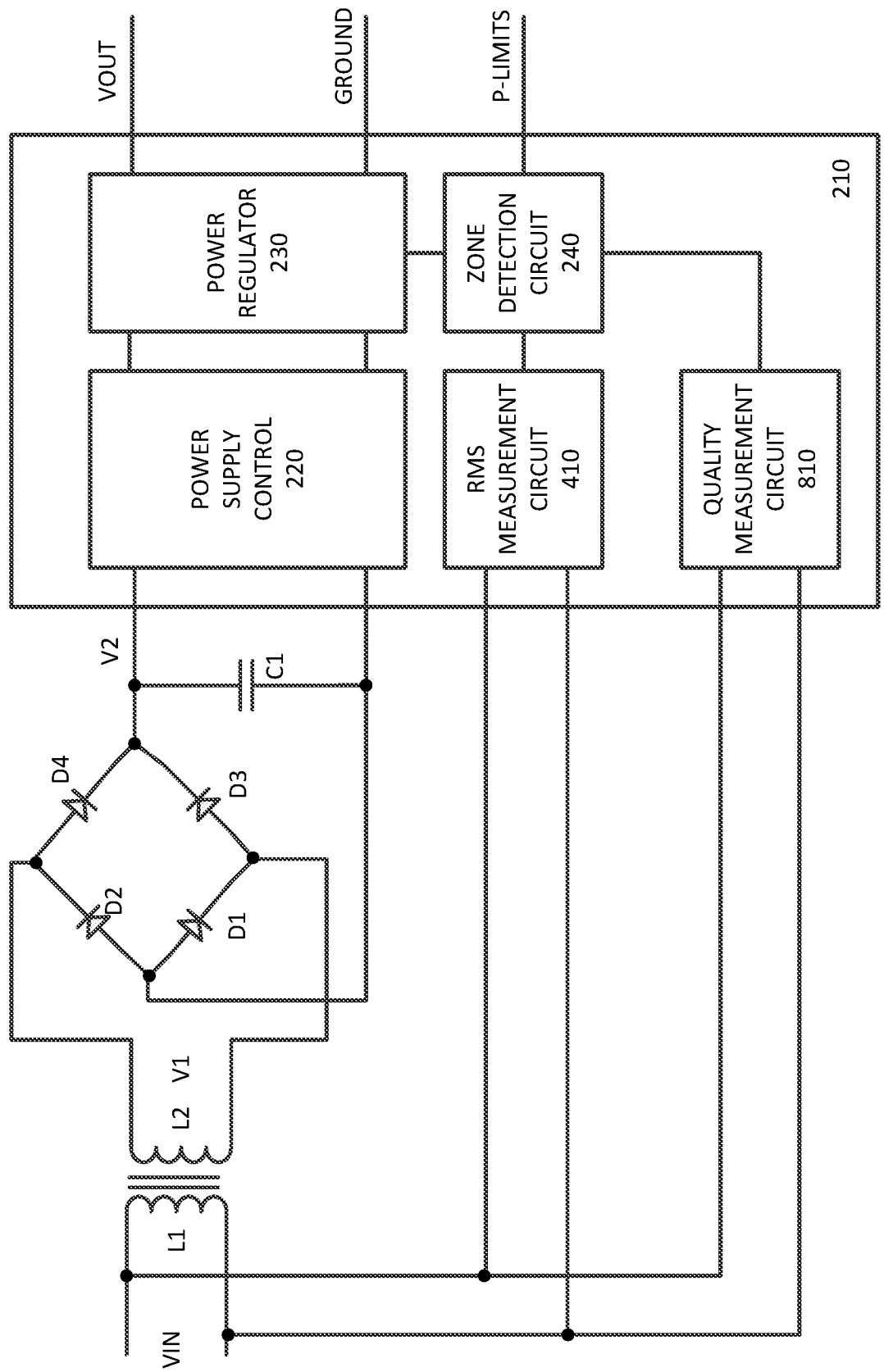
FIG. 8 is a simplified block diagram of power supply circuitry according to an embodiment of the present invention.

FIG. 8 is a simplified block diagram of power supply circuitry according to an embodiment of the present invention. In this example, power may be received from a mains power supply via a wall outlet, such as a residential outlet, or other connection at VIN. This voltage may be inductively coupled through transformer inductors L1 and L2 and provided to a diode bridge that includes diodes D1-D4. The diode bridge D1-D4 may rectify the received power supply signal. The rectified voltage may be filtered by a capacitor or filter network, represented here by C1, resulting in the DC voltage V2. The voltage V2 may be received by power supply control 220 in power supply circuit 210. Power supply control 220 may control power regulator 230, which may provide an output voltage VOUT to other circuits (shown in FIG. 9) in a computer system or other electronic device housing this power supply circuit.

The mains power supply VIN may be received by RMS measurement circuit 410 in power supply circuit 210. RMS measurement circuit 410 may determine RMS value of the voltage waveform VIN as shown above. In these and other embodiments of the present invention, RMS measurement circuit 410 may receive the voltage V1 on the secondary side of the transformer L1-L2, the filtered voltage V2, or other appropriate voltage.

The mains power supply voltage VIN may also be received by quality measurement circuit 810. Quality measurement circuit 810 may determine a quality of the mains power supply voltage VIN. For example, the mains power supply voltage waveform may have excessive amplitude or phase noise, inconsistencies in amplitude, or other characteristics that may indicate it is of a poor signal quality. In these and other embodiments of the present invention, RMS measurement circuit 410 may take a number of samples of the mains power supply voltage waveform at power up, and then average them. For example, 5, 8, 10, 20, or other numbers of samples may be taken and averaged. These samples may also be examined for consistency and this information may be used in determining the quality of the mains power supply. If the quality is not sufficient, zone detection circuit 240 may provide P-limits or other outputs based on a reduced maximum power or current draw.

If the quality or the mains power supply is sufficient, a power or current draw based on the RMS value may be determined by zone detection circuit 240. Zone detection circuit 240 may provide outputs, such as P-limits, to circuits or components in the computer system or other the electronic device based on the RMS value. The circuits and components may include one or more central processing units, graphics processing units, or other circuits or components (as shown in FIG. 9.) Zone detection circuit 240 may determine whether the RMS value is above or below a certain level, or within one of a number of ranges, as shown above.

FIG. 9 is a simplified block diagram of a computer system according to an embodiment of the present invention. While the power supply circuit 210 of FIG. 2 is shown, the power supply circuits in the other examples and in other embodiments of the present invention may be used. In this example, power may be received from a mains power supply via a wall outlet, such as a residential outlet, or other connection at input VIN. The voltage VIN may be rectified and filtered and provided to power supply control 220 in power supply circuit 210. Power supply control 220 may control power regulator 230, which may provide an output voltage VOUT to circuits or components in the computer system, in this example CPU 910 and GPUs 920, 922, and 924, which may be collectively referred to as components 950. In these and other embodiments of the present invention, other circuits or components or other numbers of these circuits or components may be included in the computer system, and one or more of these components may be omitted. In this example, graphics bus 980 may be used by GPUs 920, 922, and 924 to provide graphics data a memory or display (not shown.)

The mains power supply VIN may be received by zone detection circuit 240 in power supply circuit 210. Zone detection circuit 240 may determine one or more characteristics of the mains power supply VIN, and from that determination may set a maximum power or current draw by providing one or more outputs to components 950.

More specifically, in these and other embodiments of the present invention, once the maximum power or current draw has been determined, the power or current draw of the computer system may be limited in various ways such that the maximum power or current draw is not exceeded. For example, the voltage VOUT provided to components 950 in the computer system may be varied to adjust the computer system power or current draw. In these and other embodiments of the present invention, a frequency of a clock signal (not shown) provided to components 950 may be varied to adjust the power or current draw. In these and other embodiments of the present invention, one or more outputs may be provided to components 950 in the computer system. In the above example, P-limits may be provided to components 950 in the computer system. These outputs or P-limits may set a P-state of components 950. These P-limits may adjust power supply voltages and clock frequencies provided to components 950. These P-limits may also cause the insertion of wait or interrupt states that may be used to adjust the power or current draw of components 950. In these and other embodiments of the present invention, one or more components 950 may be fully or partially disabled in order to ensure that the maximum power or current draw is not exceeded. For example, components 950 may be disabled using P-limits, by setting a state of one or more enable signals, by disconnecting or reducing one or more power supply voltages, by disabling one or more clock signals, by varying one or more of these or other signals or voltages provided to components 950, or by using other techniques. The disabled components 950 may be non-critical or redundant components.

When a mains power supply is used to power this computer system, current may flow through power conduits, an outlet or socket, a power cord into the computer system, and through connections in the computer system. Each of the elements of this path may have a resistance. The current flowing into the computer system through these resistances may create voltage drops. These voltage drops may reduce an amplitude of the received mains power supply, making RMS measurements inaccurate. Also, changes in the current may cause noise on the received mains power supply, thereby reducing the apparent quality of the mains power supply. Accordingly, embodiments of the present invention may provide auxiliary power supply control 940 and auxiliary power regulator 942. Auxiliary power supply control 940 and auxiliary power regulator 942 may provide power to zone detection circuit 240 (and to other circuits, such as RMS measurement circuit 410 and quality measurement circuit 810, when they are included.) The residual voltage drops caused by powering zone detection circuit 240 may be calibrated to further reduce errors. Power for components 950 may be withheld until the maximum power or current that may be drawn is determined. Once a power profile including the maximum power or current has been generated, the main power supply may be activated and power may be delivered to components 950.

In these and other embodiments of the present invention, an RMS value or geographic location of the mains power supply may be determined at various times. For example, RMS measurements may be made on power-up, or when various reset events occur. Geographic locations may be determined on power up, or when various reset events occur. In these and other embodiments of the present invention, RMS measurement circuit 410 (shown in FIG. 4) may take a number of samples of the mains power supply voltage waveform at power up, and then average them. For example, 5, 8, 10, 20, or other numbers of samples may be taken and averaged. These samples may also be examined for consistency and this information may be used in determining a quality of the mains power supply, as described above.

In these and other embodiments of the present invention, RMS or location measurements may be performed in real-time, or in a near real-time basis, while the maximum power or current draw may be updated continuously, or on an occasional or regular basis. In these and other embodiments of the present invention, RMS and quality measurements may be performed in real-time, or in a near real-time basis, the maximum power or current draw may be updated continuously, or on an occasional or regular basis. The consistency of these measurements may be used in determining a quality of the mains power supply.

The present disclosure recognizes that the use of location information can be to the benefit of users. For example, the location is used to deliver power efficiently. It is contemplated that entities responsible for collecting and using this location data will comply with well-established privacy policies and/or privacy practices. In particular, such entities should implement and consistently use privacy policies and practices that are generally recognized as meeting or exceeding industry or governmental requirements for maintaining such data private and secure. Such policies should be easily accessible by users, and should be updated as the collection and/or use of data changes. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted to applicable laws and standards, including jurisdiction-specific considerations.

Despite the foregoing, the present disclosure also contemplates embodiments in which users selectively block the use of, or access to, location data. For example, the present technology can be configured to allow users to select to "opt in" or "opt out" of participation to effective turn on or turn off voltage sensing. In addition to providing "opt in" and "opt out" options, the present disclosure contemplates providing notifications relating to the access or use of location data. For instance, a user may be notified upon initial configuration of their personal computer that location information may be used to determine power supply configuration.

Moreover, it is the intent of the present disclosure that location information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers (e.g., street numbers), controlling the amount or specificity of data stored (e.g., collecting location data a city level rather than at an address level), controlling how data is stored, and/or other methods.

These and other embodiments of the present invention may provide power supply circuitry and apparatus that may be located in various types of devices, such as desktop computing devices, computer systems, servers, modular computing devices, all-in-one computers, and other devices.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A power supply circuit comprising:
    power supply circuitry to receive a mains power supply from an outlet, to generate a regulated power supply, and to provide the regulated power supply to a first circuit, the first circuit external to the power supply circuit; and
    a detection circuit to receive the mains power supply and to determine a characteristic of the mains power supply, and responsive to the determined characteristic, to provide an output signal to the first circuit,
    wherein after the determination of the characteristic, the regulated power supply is provided to the first circuit by the power supply circuitry, the first circuit receives the output signal from the detection circuit, and responsive to the output signal from the detection circuit, the first circuit adjusts a power drawn from the regulated power supply by the first circuit, and
    wherein power is not provided to the first circuit whenever the detection circuit determines the characteristic of the mains power supply.

2. The power supply circuit of claim 1 wherein the characteristic is a root mean square of the mains power supply voltage.

3. The power supply circuit of claim 1 wherein the detection circuit comprises a root mean square measurement circuit.

4. The power supply circuit of claim 1 wherein the characteristic is a location and the detection circuit comprises a global-positioning system.

5. The power supply circuit of claim 2 wherein the output signal comprises a command to set a P-state of the first circuit.

6. The power supply circuit of claim 5 wherein the output signal comprises a P-limit to set a P-state of the first circuit.

7. The power supply circuit of claim 6 wherein the first circuit comprises a graphics processing unit.

8. The power supply circuit of claim 6 wherein the first circuit comprises a plurality of graphics processing units.

9. The power supply circuit of claim 1 wherein the first circuit adjusts the power drawn from the regulated power supply by the first circuit while the first circuit receives the regulated power supply and a ground.

10. A computer system comprising:
power supply circuitry to receive a mains power supply from an outlet, to generate a regulated power supply, and to provide the regulated power supply;
a graphics processing unit to receive the regulated power supply; and
a detection circuit to determine a root mean square (RMS) value of the mains power supply voltage, and responsive to the RMS value, to determine power-sink limits and to provide the power-sink limits to the graphics processing unit,
wherein responsive to the power-sink limits from the detection circuit, the graphics processing unit adjusts a power drawn from the regulated power supply by the graphics processing unit while the graphics processing unit receives the regulated power supply and a ground, and
wherein power is not provided to the graphics processing unit while the detection circuit determines the RMS value used to determine the power-sink limits.

11. The computer system of claim 10 wherein the detection circuit comprises a root mean square measurement circuit.

12. The computer system of claim 11 wherein the detection circuit further comprises a zone detection circuit to determine a maximum power draw from the mains power supply based on the RMS value of the mains power supply voltage.

13. The computer system of claim 10 wherein the power supply circuitry further comprises a global-positioning system.

14. The computer system of claim 12 wherein the power-sink limits set a P-state of the graphics processing unit.

15. The computer system of claim 12 wherein the power-sink limits adjust power supply voltages and clock frequencies in the graphics processing unit.

16. The computer system of claim 12 wherein the computer system further comprises a central processing unit, and wherein the detection circuit further provides power-sink limits to the central processing unit.

17. A computer system comprising:
power supply circuitry to receive a mains power supply from an outlet, to generate a regulated power supply, and to provide the regulated power supply;
a graphics processing unit to receive the regulated power supply;
a quality measurement circuit to determine a quality of the mains power supply received by the power supply circuitry and to provide an output signal when the quality is below a first level, wherein the quality is based on a consistency among a plurality of measurements of the root mean square of the mains power supply voltage; and
a detection circuit to receive the output signal from the quality measurement circuit and to determine a characteristic of the mains power supply, and responsive to the output signal and to the determined characteristic, to determine power-sink limits and to provide the power-sink limits to the graphics processing unit,
wherein responsive to the power-sink limits from the detection circuit, the graphics processing unit adjusts a power drawn from the regulated power supply by the graphics processing unit, and
wherein power is not provided to the graphics processing unit while the detection circuit determines the characteristic used to determine the power-sink limits.

18. The computer system of claim 17 wherein the detection circuit comprises a root mean square measurement circuit to provide a value of the root mean square of the mains power supply voltage.

19. The computer system of claim 18 wherein the detection circuit further comprises a zone detection circuit to determine a maximum power draw from the mains power supply based on the value of the root mean square of the mains power supply voltage.

20. The computer system of claim 17 wherein the detection circuit comprises a global-positioning system.

21. The computer system of claim 17 wherein the power-sink limits adjust power supply voltages and clock frequencies in the graphics processing unit.

22. The computer system of claim 17 wherein the graphics processing unit adjusts the power drawn from the regulated power supply by the graphics processing unit while the graphics processing unit receives the regulated power supply and a ground.

* * * * *